United States Patent

[11] 3,618,770

| [72] | Inventors | Lawrence E. Pohl<br>Los Gatos;<br>Prodyot Roy, Saratoga, both of Calif. |
|---|---|---|
| [21] | Appl. No. | 8,502 |
| [22] | Filed | Feb. 4, 1970 |
| [45] | Patented | Nov. 9, 1971 |
| [73] | Assignee | The United States of America as represented by the United States Atomic Energy Commission |

[54] COLD TRAP
7 Claims, 1 Drawing Fig.

[52] U.S. Cl. .................................................. 210/85,
210/179, 210/184, 210/440, 210/222
[51] Int. Cl. .................................................. B01d 35/06
[50] Field of Search .......................................... 210/42, 49,
85, 179, 222, 184, 440

[56] References Cited
UNITED STATES PATENTS

| 2,830,705 | 4/1958 | Johannesen .................. | 210/222 |
| 3,127,255 | 3/1964 | Winslow ...................... | 210/223 X |
| 3,554,374 | 1/1971 | Blair et al. ................... | 210/85 |

Primary Examiner—John Adee
Attorney—Roland A. Anderson

ABSTRACT: A device for collecting and storing impurities found in high-temperature sodium or other liquid metal loops of nuclear reactors. The effectiveness of nucleating and precipitating these impurities is increased by electromagnetic stirring of the cooled sodium. The electromagnetic stirring action of the sodium or other liquid metal is accomplished with a polyphase rotating magnetic field.

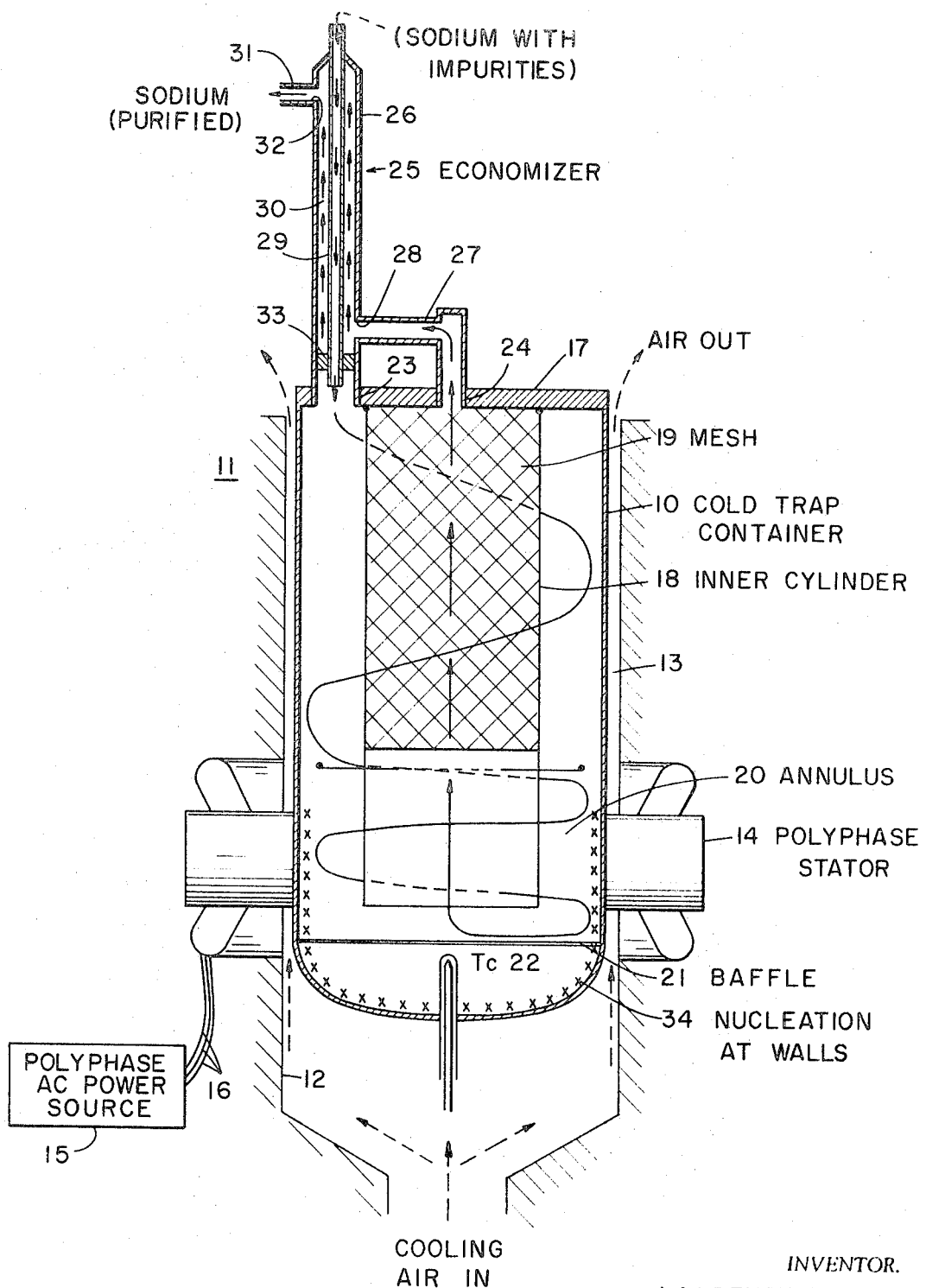

COLD TRAP

BACKGROUND OF THE INVENTION

During operation of liquid-sodium-loop systems of nuclear reactors, impurities are formed by the reaction of atmospheric contaminants, e.g., $O_2$, $H_2O$, $N_2$ and $CO_2$, with the sodium, by the reaction of the sodium with water from leaks in the secondary system steam generator or by the reaction of sodium and its steel containment. When saturation conditions are reached, these impurities nucleate as compounds and particulate material. These may be transported around the system to produce plugging, corrosion, confuse instrumentation, or other deleterious effects unless "trapped" or filtered out. A cold trap is commonly employed to produce the temperature environment and provide nucleation sites for impurity formation and retention, thus cleaning the sodium. An example of a cold trap effectively utilized for this purpose is described and claimed in U.S. Pat. application, Ser. No. 741,959 by Roy C. Blair et al., filed July 2, 1968 now U.S. Pat. No. 3554374 and assigned to the assignee of the present invention.

In usual practice, a portion of the bulk stream of the sodium coolant is bypassed through a heat economizer, then channeled into a vessel where heat rejection takes place until the temperature is reduced. As the cold trap temperature decreases, the various impurities in solution (NaH, $Na_2O$, etc.) reach saturation solubility. Further cooling causes some degree of supersaturation, and impurities tend to nucleate and precipitate on convenient nucleation sites. In conventional cold traps, in order to increase trapping efficiency, a large surface area (typically in the form of stainless steel mesh packing) is used to facilitate nucleation and precipitation. The "purified" sodium then leaves the trap to return to the bulk stream. Furthermore, in the conventional cold trap the flow is low, based on the idea that the "impure" sodium must reside for a time (typically 5 minutes or more) in the trap in order that effective nucleation may take place.

The mass transfer coefficient $K$ for the impurities precipitating on the wall of the cold trap can be expressed as:

$$dw/dt = K_d A (C - C°)$$

where:  $dw/dt$ = g.depositing/sec.
$A$ = surface area
$C$ = concentration of the supersaturated impurities
$C°$ = saturation solubility
$K_d$ = diffusion mass transfer coefficient From the above equation, it can be seen that the cold trap efficiency can be increased either by increasing the surface area ($A$) for nucleation (e.g., stainless steel mesh), or by increasing the mass transfer coefficient $K_d$.

It has been shown that the mass transfer coefficient $K_d$ increases with the increase of velocity (or Reynolds number) of the system when the mass transfer is a diffusion controlled process. It has also been established that nucleation and precipitation of impurities ($Na_2O$) is a diffusion controlled process at conventional cold trap temperatures and flow rates. Hence, in reality, the above mass transfer relationship indicates that long residence time per se is not necessarily the criteria for increasing cold trap efficiency. The reason for increase of mass transfer coefficient due to increase of $N_{Re}$ (turbulence) can be explained as follows: In the region of diffusion controlled precipitation, increasing the turbulence ($N_{Re}$) of sodium flowing through the cold trap will increase the transfer of the impurities across the liquid boundary layer on the nucleation sites; consequently, the cold trap efficiency will be increased. This could, of course, be accomplished by increasing the throughput of sodium (i.e., increasing the cold trap flow). However, the heat transfer characteristics place a limit on this for a given size (heating and cooling surface area) of trap. Furthermore, increasing the throughput by, say, a factor of 10 only increases the Reynolds number by the same amount for a given geometry while, at the same time, requiring the extraction and dissipation of 10 times the heat. This, in turn, requires substantially larger heat transfer and dissipation equipment along with a larger heat waste.

SUMMARY OF THE INVENTION

A more effective method to nucleate and precipitate the impurities in cold traps is to increase the local velocity (hence, the Reynold's number by a factor of 100 or more) in the trap by rapid circulation or stirring of the liquid sodium while maintaining the same throughput. The present invention employs an electromagnetic stirring action of the sodium in the outer annulus of the trap with a polyphase rotating magnetic field. The rotating field from the stator links the liquid metal, such as sodium, in the annulus, inducing eddy currents which, in turn, produce magnetic linkages with the stator field. The liquid metal attempts to follow the stator field in synchronism, but is prevented from doing so by drag forces, resulting in slippage. This action is analogous to rotor motion in a conventional polyphase induction motor.

BRIEF DESCRIPTION OF DRAWING

The single FIGURE is a view, partially in cross section, of an embodiment of the invention.

DESCRIPTION OF THE INVENTION

The improved cold trap illustrated in the drawing comprises outer container 10 positioned in a housing or support structure 11 constructed to define therein a cooling air passage or duct 12 within which container 10 is positioned so as to define a passageway 13 therebetween through which air passes thereby, the airflow being illustrated by the flow arrows upwardly past container 10. An annular polyphase stator 14 is positioned in housing 11 adjacent duct 12 and extends around the lower portion of container 10, stator 14 being powered by a polyphase AC source 15 via leads 16. An end cap or cover 17 is mounted over the open upper end of container 10 to which is centrally mounted an inner cylinder 18 containing in approximately the upper two-thirds thereof a mesh 19 of, for example, stainless steel or other suitable material. Inner cylinder 18 is positioned within container 10 so as to define an annulus 20 therebetween. A baffle assembly 21 is positioned within container 10 intermediate the lower end of cylinder 18 and the closed end portion of container 10. A thermocouple 22 extends through the closed end portion of container 10. Cover or end cap 17 is provided with a pair of apertures 23 and 24 to which an economizer or heat exchanger generally indicated at 25 is connected, aperture 24 being centrally located in cover 17. Economizer 25 contains an outer or larger diameter conduit or tube 26 which is mounted at one end in aperture 23 with a conduit or tube 27 mounted at one end in aperture 24 and secured at the opposite end in an opening 28 in conduit or tube 26. Positioned within outer tube 26 is a smaller diameter inner conduit or tube 29 defining an annulus 30 therebetween. Outer tube 26, at the upper end thereof, is closed about inner tube 29 with a conduit or tube 31 secured in an opening 32 adjacent the closed end of tube 26. A seal or block 33 is mounted intermediate outer and inner tubes 26 and 29 at the end thereof adjacent aperture 23 in cover 17 to prevent fluid flow from tube 26 into annulus 20 of container 10.

In operation of the above described embodiment of the invention, sodium with impurities flows into the upper end of inner conduit or tube 29 of economizer 25, as indicated by the legend and downwardly directed flow arrows, due to external pump action, and flows through tube 29 into the annulus 20 between trap container 10 and inner cylinder 18. The sodium begins to spiral, as indicated by the solid arrow, picking up rotational velocity as it approaches the influence of the rotating magnetic field in region A—A created by the polyphase stator 14. As the sodium spirals through the annulus 20, it is continually cooled by air flowing over the walls of container 10 as the air flows upwardly through passageway 13, the cooling of the sodium causes it to be freed of impurities which accumulate at nucleation sites on the walls of container 10 as indicated at 34 and on the steel mesh 19, if used. At point B on the sodium flow arrow adjacent the lower end of cylinder 18, the sodium is at minimum temperature where it turns to flow up the inner cylinder 18 where further impurities accumulate on the mesh 19, whereafter the purified sodium passes through aperture 24 in cover 17 and discharges through outlet 31 via tube 27 and annulus 30 of economizer 25. The purified sodium flowing outward through annulus 30 is in heat exchange relation with the incoming impure sodium whereby heat is removed from the incoming sodium, the outgoing purified sodium being reheated thereby. Some of the agglomerated impurities at the nucleation site 34 detach and either settle on the bottom of the trap or be carried as fine particulates in the steam. Since the particulates might be carried back into the main stream, the mesh 19 is sufficiently fine to prevent such, and in addition, the baffle assembly 21 serves to allow the particulates to pass therethrough thus removing same from the normal sodium flow area of the trap. While not shown, the thermocouple 22 may be connected to a cooling air control means for controlling the flow of air or temperature thereof through passage 12 and about container 10 for maintaining the container at a desired temperature.

Tests conducted on the inventive cold trap have shown that increase of turbulence ($N_{Re}$) significantly accelerates the precipitation of corrosion products, thereby greatly advancing the state of this art.

It has thus been shown that the present invention provides advantages over the prior-known cold traps as follows:

1. It increases the rate of cleanup over the conventional cold trap, especially for hard-to-trap impurities such as hydrogen, which will be especially prevalent in the secondary system of the reactor.
2. It increases the capacity of the cold trap by utilizing the cooled surfaces more effectively as nucleation sites. Thus, a smaller cold trap can be employed for a given impurities trapping capacity.
3. It will produce a lower plugging temperature and tend toward eliminating a high-temperature break (in the main system) by greater, more effective, removal of hydrogen compounds. Elimination of high-temperature breaks will make the plugging indicator temperatures more reliable in terms of $O_2$ in sodium.
4. It gives more flexibility in cold trap operations. The efficiency can be changed as desired (e.g., emergency situation resulting from onset of leakage in the steam generator) without increasing the flow through which would cause needless power loss (wastage) and require a larger heat dump in the reactor system.

While the above description has been directed to the use of liquid sodium as the coolant, the inventive cold trap will operate effectively for other liquid metal coolants.

Although a particular embodiment of the invention has been illustrated and described, modifications and changes will become apparent to those skilled in the art, and it is intended to cover in the appended claims all such modifications and changes as come within the spirit and scope of the invention.

What We claim is:

1. An apparatus for collecting impurities in liquid metal coolant which precipitate out under prescribed temperature conditions and cause plugging of components in an associated system comprising: a container means open at one end and closed at the opposite end thereof, a cover means for said open end of said container means, an inner cylinder means positioned within said container and defining an annulus therebetween, a heat exchanger means operatively connected to said removable cover means, said heat exchanger means being connected so as to direct high-temperature liquid metal coolant into said annulus and connected to receive low-temperature liquid metal coolant from within said inner cylinder, means located about said container means for producing a polyphase rotating magnetic field which causes a stirring action of liquid metal within said annulus, and means for cooling said container means, whereby high-temperature liquid metal coolant is cooled in at least said annulus such that impurities therein precipitate out and collected on at least certain of said container means interior wall surfaces and purified coolant is discharged through said heat exchanger means.

2. The apparatus defined in claim 1, wherein said cover means includes a substantially centrally located aperture and a peripherally located aperture, and wherein said heat exchanger means is connected so as to direct high-temperature liquid metal coolant through said peripherally located aperture and to receive low-temperature liquid coolant through said centrally located aperture.

3. The apparatus defined in claim 1, wherein said inner cylinder means is provided in at least a portion of the interior thereof with a meshlike means constructed from suitable material for providing an additional nucleation site for precipitating impurities.

4. The apparatus defined in claim 1, wherein said polyphase rotating magnetic-field-producing means includes a polyphase stator means located adjacent the closed end of said container means and space from said container means, said stator means being activated by a polyphase alternating current power source.

5. The apparatus defined in claim 1, wherein said cooling means includes means for directing a flow of cooling air about said container means in a direction from the closed end toward the open end thereof.

6. The apparatus defined in claim 1, additionally including baffle means located within said container means intermediate the closed end thereof and said inner cylinder means to allow particulates of the impurities to pass therethrough for settling in said closed end of said container means and prevent same from being carried into said heater exchanger means.

7. The apparatus defined in claim 1, additionally including a temperature-indicating means positioned in the closed end of said container means for determining the temperature therein.

* * * * *